United States Patent [19]

Kleinfeld

[11] Patent Number: 4,752,906
[45] Date of Patent: Jun. 21, 1988

[54] TEMPORAL SEQUENCES WITH NEURAL NETWORKS

[75] Inventor: David Kleinfeld, Berkeley Heights, N.J.

[73] Assignee: American Telephone & Telegraph Company, AT&T Bell Laboratories, Murray Hill, N.J.

[21] Appl. No.: 942,431

[22] Filed: Dec. 16, 1986

[51] Int. Cl.⁴ .............................................. G06F 15/46
[52] U.S. Cl. ..................................... 364/807; 364/300
[58] Field of Search ............... 364/807, 824, 724, 482, 364/200, 900, 300, 811, 815

[56] References Cited

U.S. PATENT DOCUMENTS

| | | | |
|---|---|---|---|
| 3,774,019 | 11/1973 | Cook | 364/824 |
| 4,034,156 | 7/1977 | Willmore | 364/824 |
| 4,344,150 | 8/1982 | McLaughlin | 364/724 |
| 4,393,272 | 7/1983 | Itakura | 364/724 |
| 4,438,504 | 3/1984 | Favin | 364/724 |
| 4,536,844 | 8/1985 | Lyon | 364/487 |
| 4,558,454 | 12/1985 | Hills | 364/724 |
| 4,563,681 | 1/1986 | Godard | 364/724 |
| 4,569,030 | 2/1986 | Butterweck | 364/724 |
| 4,630,299 | 12/1986 | Welles | 364/724 |
| 4,719,591 | 1/1988 | Hopfield | 364/807 |

OTHER PUBLICATIONS

"A Model of Associative Memory in the Brain", K. Fukushima, Kybernetik, vol. 12 (1973), pp. 58–63.

Primary Examiner—Michael R. Fleming
Attorney, Agent, or Firm—Henry T. Brendzel

[57] ABSTRACT

A sequence generator employing a neural network having its output coupled to at least one plurality of delay elements. The delayed outputs are fed back to an input interconnection network, wherein they contribute to the next state transition through an appropriate combination of interconnections.

12 Claims, 2 Drawing Sheets

TEMPORAL SEQUENCES WITH NEURAL NETWORKS

BACKGROUND OF THE INVENTION

This invention relates to sequence generators, and more specifically, to systems employing neural computation to develop sequences of output signal vectors.

Neural networks have been described by J. J. Hopfield in "Neurons With Graded Response Have Collective Computational Properties Like Those of Two-state Neurons"; *Proc. Natl. Sci., USA* Vol. 81, pp. 3088-3092, and by J. J. Hopfield and D. W. Tank in "'Neural' Computation of Decisions in Optimization Problems", *Biological Cybernetics*, Vol. 52, (1985), pp. 141-152; as well as in U.S. patent application Ser. No. 693,479 now U.S. Pat. No. 4,660,166 filed on behalf of J. J. Hopfield on Jan. 2, 1985, and U.S. patent application Ser. No. 795,789 now U.S. Pat. No. 4,719,591 filed on behalf of J. J. Hopfield and D. W. Tank on Nov. 7, 1985.

Basically, a neural network is a highly parallel computational circuit comprising a plurality of amplifiers, with each of the amplifiers feeding back its output signal to itself and all of the other amplifiers through conductance $T_{ij}$. The $T_{ij}$ conductances (where $T_{ij}$ denotes the conductance between the output of amplifier j and the input of amplifier i) and the associated connections can be thought of as comprising a feedback network which has one output signal set and two input signal sets. The output signal set is applied to the amplifier inputs, one of the input signal sets is derived from the amplifier outputs, and the other input signal set is responsive to input stimuli applied to the neural network. As shown in the prior art, one can explicitly specify the values of the $T_{ij}$ conductances to achieve predetermined results, such as reaching different specified output states of the amplifier in response to different ranges of input stimuli. Also as described in the prior art, an input interconnection network may be interposed between the input stimuli and the second set of inputs of the feedback network. The input interconnection network permits manipulation of the expected input signals to corresponding signals that drive the feedback network and the amplifiers.

The neural network model described most extensively in the prior art is one with symmetric couplings, i.e., the connections between pairs of neurons satisfy the relationship $T_{ij}=T_{ji}$. The dynamics of such a network is relatively simple. The system moves in the direction of reducing a global energy function of the circuit, E, to states that are local minima of E, and once a local minimum is reached, the circuit remains at the stable state until perturbed by a sufficiently large input signal that moves the circuit to a different local minimum. The local minima may be thought of as the stored "memories" that are characterized by the vectors $M^\mu$. An associative memory can be constructed with the Hopfield neural network by constructing the connection strengths $T_{ij}$ in accordance with the outer product, or Hebb, rule, to wit, by assigning $$T_{ij} = \sum_{\nu=1}^{n} M_i^\nu M_j^\nu$$

for $j \neq i$, and 0 otherwise.

A symmetric-coupling neural network thus does not provide temporal association. Asymmetric couplings, on the other hand, can generate sequential memories by adding weighted terms of the form $M^{\mu+1}M^\mu$ to the T terms in the feedback matrix. Each of these $M^{\mu+1}M^\mu$ terms is a projection of one "memory" to the next "memory". The problem with this technique for generating sequences is that only sequences of limited length are achieved because the state of the network becomes progressively mixed among memories comprising the sequence when long or cyclic sequences are used. More specifically, the essential difficulty in generating sequences through modifications of the feedback matrix is that the network does not become stationary in any one memory before transition to the next memory begins.

It is an object of this invention to provide a structure that simply and efficiently permits the realization of any desired sequence developed by neural networks.

SUMMARY OF THE INVENTION

These and other objects of the invention are achieved with a neural network having its output coupled to at least one plurality of delay elements. The delayed outputs are fed back to an input interconnection network, wherein they contribute to the next state transition through an appropriate combination of interconnections.

DETAILED DESCRIPTION

Figure 1:
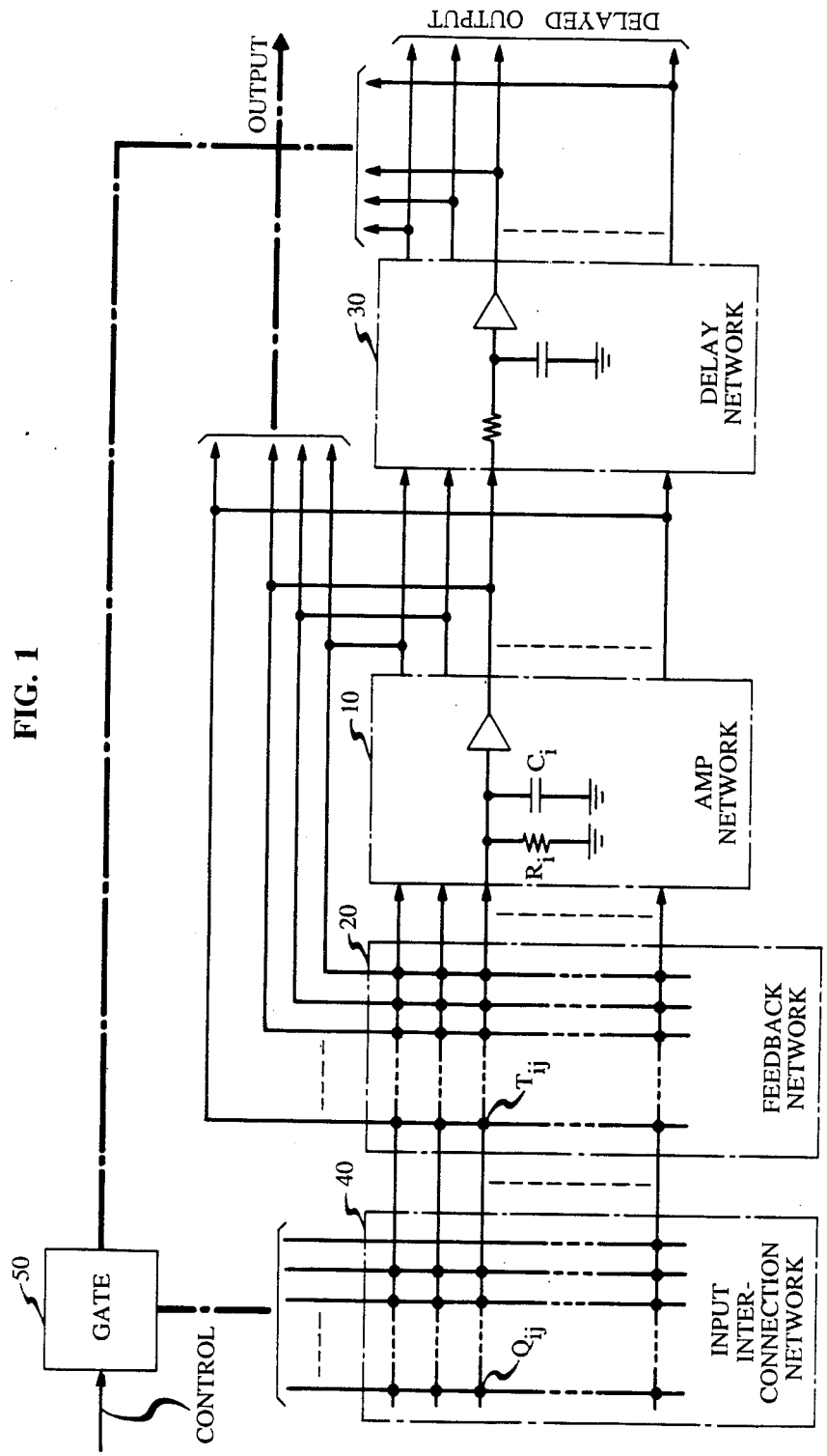
FIG. 1 illustrates one embodiment of a sequence generator in accordance with the principles of my invention.

With reference to FIG. 1, a sequence generator is realized with a neural network combined with a delay network and an input interconnection network. The neural network, as described in the prior art, comprises an amplifier network 10 feeding its output signal to, and receiving its input signals from, a feedback network 20. Delay/averaging network 30 is responsive to amplifier network 10, and input interconnection network 40 is responsive (through a gate network 50) to the output of delay/averaging network 30. Network 40 feeds its output signals to feedback network 20.

The sequence generation action can be seen when it is recalled that the equation of motion for the neural network (networks 10 and 20), as taught by the prior art, minimizes the energy function expressed by $$E = -\tfrac{1}{2} \sum_i \sum_j T_{ij} V_i V_j + \sum_i (1/R_i) \int_0^{V_i} g_i^{-1}(V) dV - \sum_i V_i I_j. \quad (1)$$

where $V_i$ and $V_j$ are the output voltages of amplifiers i and j, respectively, in amplifier network 10; $T_{ij}$ is the conductance within the feedback network that connects the output of amplifier j to the input of amplifier i; $R_i$ is the resistance between the input of amplifier i and ground; $g_i^{-1}(V)$ is the inverse of the transfer function of amplifier i; and $I_i$ is the current input to feedback network 20 (from input interconnection network 40) leading to the input of amplifier i. When gate network 50 merely passes the signals from delay/averaging network 30 to interconnection network 40, a perusal of the FIG. 1 structure reveals that the last term in Equation (1), $$\sum_i V_i I_j,$$

which accounts for the circuit into the feedback network contributed by the interconnection network, may be replaced with $$\sum_i V_i \sum_j Q_{ij} \overline{V}_j(t) \tag{2}$$

where $$\overline{V}_j(t) = \int_0^\infty V_j(t-x)D(x)dx \tag{3}$$

represents the delayed value of the $j^{th}$ output, determined by averaging over the history of the $j^{th}$ output with a normalized weighting function $D(x)$. The delay time is given by the time constant $\tau_D$ associated with $D(x)$. Two particular implementations of the delay/average function may be pure delay, and an exponentially decaying averaging delay. The first may be realized with pure delay means, $D(t)=\delta(t-\tau_D)$, yielding delayed signals $\overline{V}_j(t)=V_j(t-\tau_D)$. The second may be implemented with a simple resistor-capacitor network, for which case $D(t)=(1/\tau_D)e^{-t/\tau_D}$. The connection strengths $Q_{ij}$ are constants that are chosen to cause the desired transitions between sequential states. In accordance with one approach, the $Q_{ij}$ strengths can follow the relationship $$Q_{ij} = \begin{cases} \sum_{\nu=1}^{m} M_i^{\nu+1} M_j^{\nu} & i \neq j \\ 0 & i = j \end{cases} \tag{4}$$

where $M_j^\mu$ is the $j^{th}$ output of network 10 ($V_j$) in the $\mu^{th}$ output vector, $M_i^{\mu+1}$ is the $i^{th}$ output of network 10 in the next $(\mu+1^{th})$ output vector, and m is the length of the sequence (i.e., the number of different M vectors created). To achieve a cyclic sequence, the summation of Equation (3) is performed in modulo m. In other words, $M^{m+1}=M^1$.

Network 50 is able to disconnect the feedback path from delay/averaging network 30 to interconnection network 40 by action of the control port, causing the FIG. 1 circuit to settle to a quiescent state. Gate network 50 can also be endowed with the ability to add a "kicker" signal vector to the fed-back voltage, under control of an enabling signal at the control port which could drive the FIG. 1 circuit from one cyclic sequence to a second cyclic sequence; both of which are designed into the $Q_{ij}$ interconnection values.

The output of the FIG. 1 circuit can be obtained from the output of amplifier network 10 or, alternatively, from the output of delay/averaging network 30.

The structure of delay/averaging network 30 can be quite simple. In FIG. 1 it is shown as a simple RC network, which produces a delay related to the RC time constant. To avoid diminution of the signal because of the series resistor in the RC network, and to insure a low output impedance to the delay network, the FIG. 1 delay/averaging network 30 includes an amplifier following the RC delay circuit.

Figure 2:
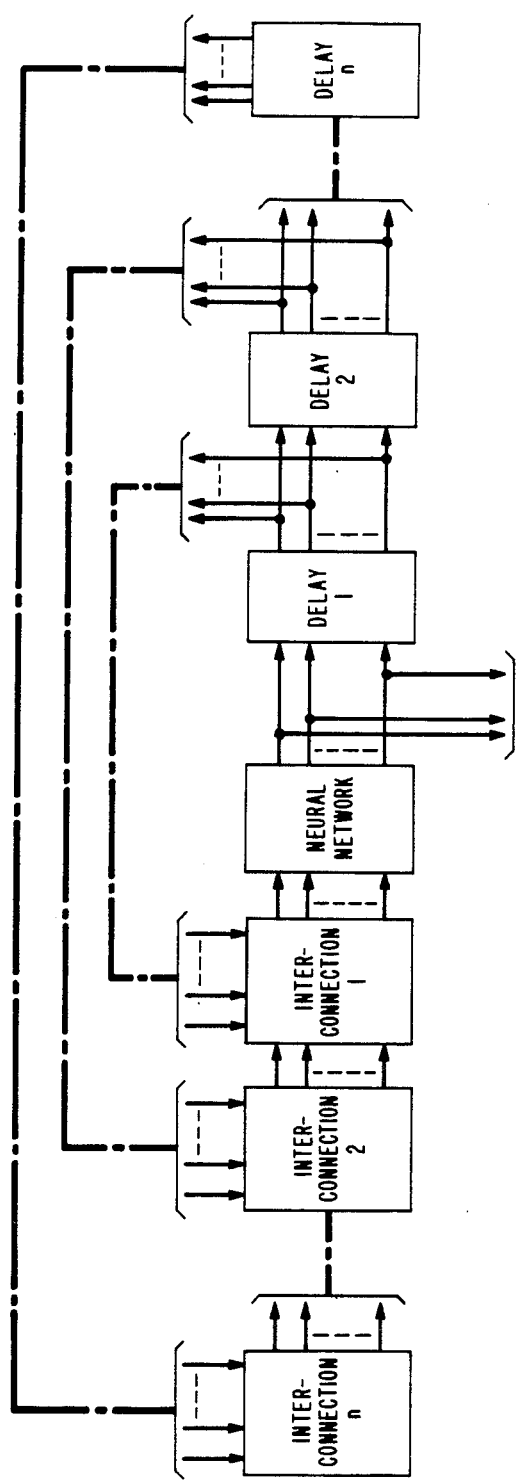
FIG. 2 illustrates a second embodiment of a sequence generator in accordance with the principles of my invention.

Many changes in construction and widely differing embodiments would, no doubt, suggest themselves to those skilled in the art to which this invention pertains, which would not depart from the spirit and scope of this invention. For example, the FIG. 1 arrangement can generate sequences where each state is derived from the immediately previous state. FIG. 2 presents a somewhat more general realization for developing sequences where each successive state is a function of more than one previous state. In FIG. 2, neural network 60 is fed by a serially connected arrangement of interconnection networks (70,71, and 72 in FIG. 2). Each one of the interconnection networks of FIG. 2 is similar in structure to interconnection network 40 of FIG. 1, with the only difference being that another set of inputs is available for adding the current offered by a preceding interconnection network to the network's output current. Each of the above interconnection networks derives its inputs from another interconnection network and from the output of a different delay network in a set of delay networks (70,81, and 82 in FIG. 2) that are responsive to the output of neural network 60.

As can be appreciated from the analysis related to the FIG. 1 arrangement, on the FIG. 2 arrangement, each output state that is developed by neural network 60 is a function of N previous delayed outputs, that is, where N is the number of delay networks.

As another example of a variation in accordance with the principles of my invention, the gating network presented in FIG. 1 does not necessarily have to be interposed between the delay network and the interconnection network. Any location where controlled interference with the sequence generation process is possible is equally acceptable. Also, the simple delay network shown in FIG. 1 (the RC delay coupled with amplification) can easily be substituted with more elaborate delay means, including clocked delay means—such as CCDs. Also, when more than one delay network is realized, the delay between different networks need not necessarily be of equal value.

What is claimed is:

1. A sequence generator comprising:
    a neural network responsive to input signals applied to a plurality of inputs that are internally connected to a cross-connect network, where said neural network develops a plurality of output signals responsive to said input signals and to interconnection values within said cross-connect network;
    a delay/averaging network responsive to said plurality of output signals of said neural network, for developing a delayed plurality of output signals that are related to said plurality of output signals of said neural network; and
    an input interconnection network responsive to said plurality of delayed output signals of said delay network for developing said plurality of input signals of said neural network; WHERE
    the interconnections within said cross-connect network develop specified local minima in the energy function describing the response of said neural network to said input signals, and said input interconnection network determines the sequence of neural network output signals developed by the sequence generator.

2. The generator of claim 1, wherein each input signal in said plurality of input signals is related to said delayed output signals through a summing interconnection of preselected summing strengths.

3. The arrangement of claim 1 wherein each $i^{th}$ input signal of said plurality of input signals, where i is a number, is related to $$\sum_j Q_{ij} \int_0^\infty V_j(t-x)D(x)dx,$$

where $$\int_0^\infty V_j(t-x)D(x)dx$$

is the $j^{th}$ delayed output signal of said plurality of delayed output signals and j is a number, $D(x)$ is a preselected delay function characterizing said delay/averaging network as a function of the integration variable x, $V_j(t-x)$ is the $j^{th}$ output voltage at time $(t-x)$, each $Q_{ij}$ is a preselected constant, and the summation is over all values of j from 1 to N where N is the number of delayed output signals in said plurality output signals.

4. The arrangement of claim 3 for developing a sequence $M^1, M^2, \ldots M^\mu, M^{\mu+1}, \ldots M^m$, of said plurality of output signals, with each $M^\mu$ representing said plurality of output signals at a point in time, wherein $$Q_{ij} = \sum_{\nu=1}^m M_i^{\nu+1} M_j^\nu$$

for $i \neq j$ and 0 otherwise.

5. The arrangement of claim 3 for developing a cyclic sequence $M^1, M^2, \ldots M^\mu, M^{\mu+1}, \ldots M^m, M^1, \ldots$, of said plurality of output signals, with each $M^\mu$ representing said plurality of output signals at a point in time, wherein $$Q_{ij} = \sum_{\nu=1}^m M_i^{\nu+1} M_j^\nu$$

for $i \neq j$ and 0 otherwise, and $M^{m+1} = M^1$.

6. The arrangement of claim 1 further comprising a gating network interposed in the signal loop created by said neural network, said delay network and said input interconnection network.

7. The arrangement of claim 6 wherein said gating means, under influence of an applied control signal, either transmits its input signal to its output or inhibits said transmitting.

8. The arrangement of claim 6 wherein said gating means, under influence of an applied control signal, transmits to its output either its input signal or a preselected different signal.

9. The arrangement of claim 1 further comprising a gating network interposed between said delay network and said input interconnection network.

10. A sequence generator comprising:
a neural network, developing a plurality of output signals in response to a plurality of input signals and characterized by an internal cross-connect network with interconnections that develop specified local minima in the energy function describing the response of said neural network to said input signals;
a delay network responsive to said plurality of output signals of said neural network, developing K delayed pluralities of output signals with each delayed plurality of said K delayed pluralities having a different delay from said plurality of output signals of said neural network; and
an input interconnection network responsive to said K pluralities of delayed output signals of said delay network for supplying a plurality of input signals to said neural network and for providing the connectivity that defines the sequence of signals generated by the sequence generator.

11. The arrangement of claim 10 further comprising a gating network interposed in the signal loop created by said neural network, said delay network and said input interconnection network.

12. A sequence generator comprising:
a neural network, developing a plurality of output signals in response to a plurality of input signals and characterized by an internal cross-connect network with interconnections that develop specified local minima in the energy function describing the response of said neural network to said input signals;
at least one delay/averaging network responsive to said plurality of output signals of said neural network, each developing a set of delayed plurality of output signals; and
at least one input interconnection network each responsive to a set of said plurality of delayed output signals for supplying a plurality of input signals to said neural network and for providing the connectivity that defines the sequence of signals generated by the sequence generator.

* * * * *